(No Model.) 3 Sheets—Sheet 1.
R. EICKEMEYER, Jr.
ELECTRIC RESISTANCE BOX.
No. 454,207. Patented June 16, 1891.
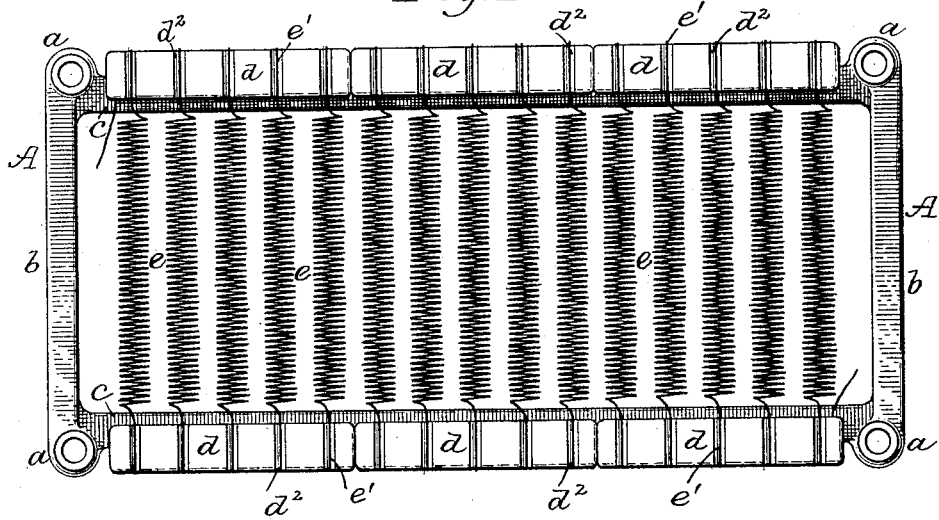
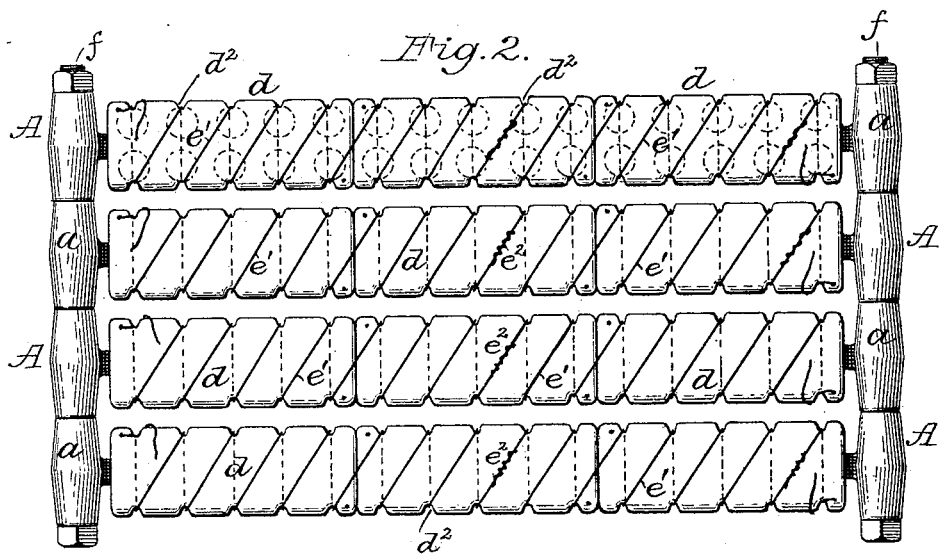
Attest:
Philip F. Larner
Howell Britt
Inventor:
Rudolf Eickemeyer Jr.
By M.E. Wood
Attorney (No Model.) 3 Sheets—Sheet 2.
R. EICKEMEYER, Jr.
ELECTRIC RESISTANCE BOX.
No. 454,207. Patented June 16, 1891.
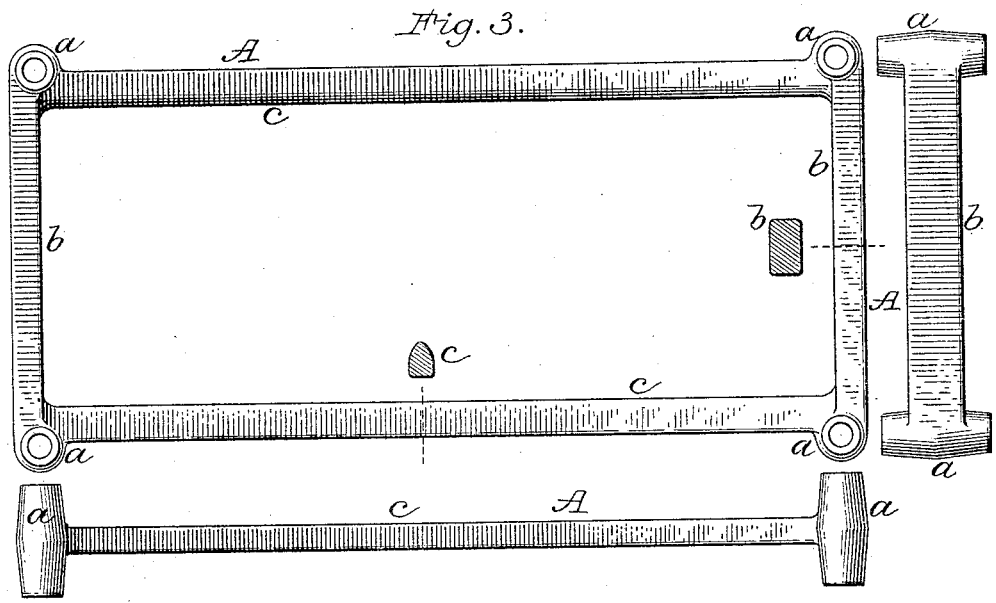
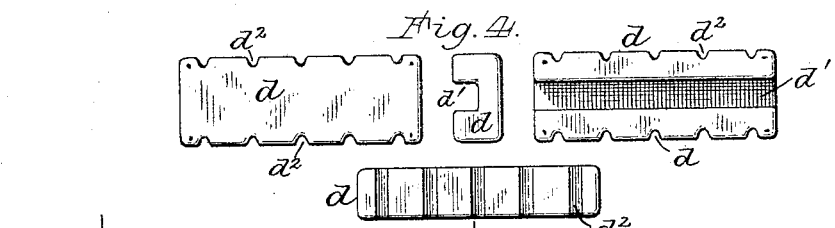
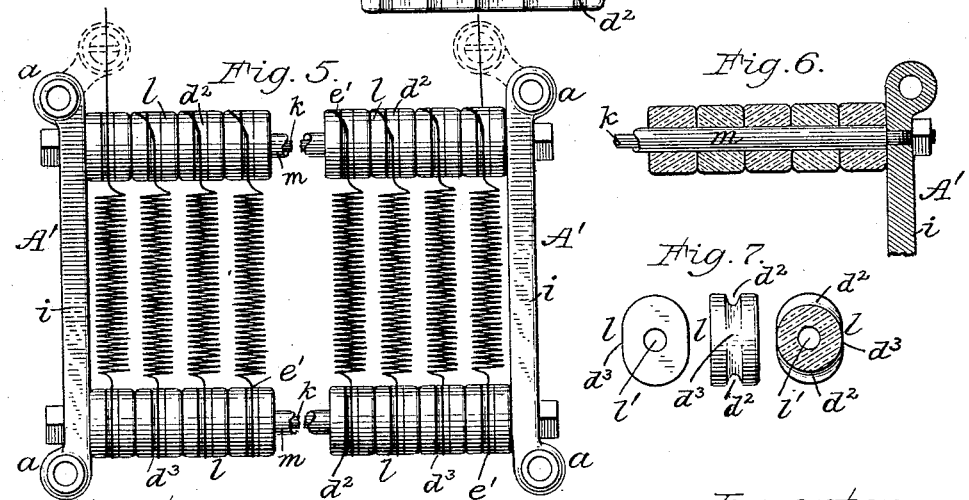
Attest:
Philip F. Larner
Howell Battle
Inventor:
Rudolf Eickemeyer, Jr.
By _____
Attorney.

(No Model.) 3 Sheets—Sheet 3.
R. EICKEMEYER, Jr.
ELECTRIC RESISTANCE BOX.
No. 454,207. Patented June 16, 1891.
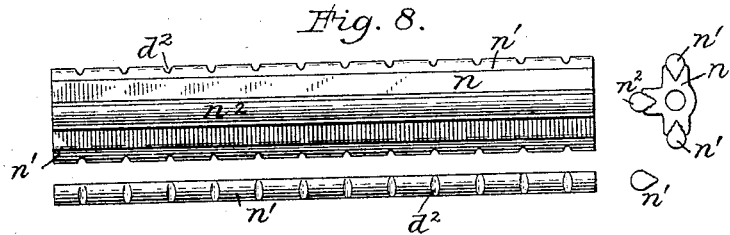
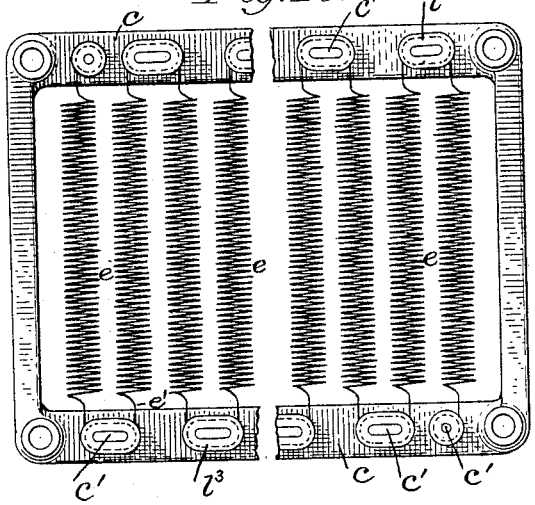
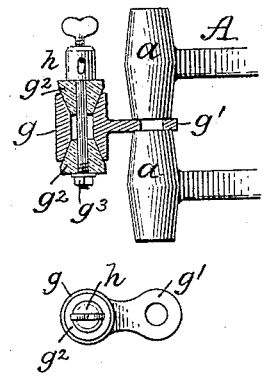
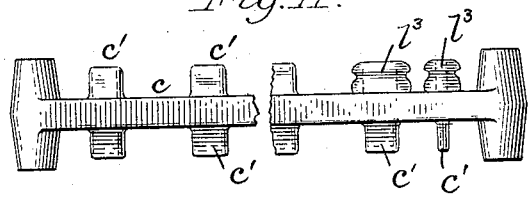
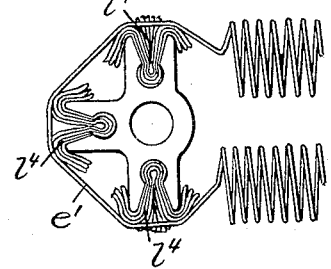

UNITED STATES PATENT OFFICE.

RUDOLF EICKEMEYER, JR., OF YONKERS, NEW YORK.

ELECTRIC RESISTANCE-BOX.

SPECIFICATION forming part of Letters Patent No. 454,207, dated June 16, 1891.

Application filed February 16, 1891. Serial No. 381,617. (No model.)

*To all whom it may concern:*

Be it known that I, RUDOLF EICKEMEYER, Jr., of Yonkers, in the county of Westchester and State of New York, have invented certain new and useful Improvements in Electric Resistance-Boxes; and I do hereby declare that the following specification, taken in connection with the drawings furnished and forming a part thereof, is a clear, true, and complete description of my invention.

Resistance-boxes have heretofore embodied frames mainly composed of wood, and they have been constructed in various forms; but I know of none which, prior to my present invention, could be employed with safety in electric apparatus connected with ordinary arc-light circuits, although fire-proof structures have been heretofore employed for supporting the resistance-coils of such "equalizers" as are employed at central electric stations. As compared with said equalizers, my resistance-boxes involve certain novel and valuable characteristics, in that each of my boxes embodies a pair of rows of resistance-coils mounted upon and parallel with a simple substantially flat supporting-frame, and two or more of said boxes are united to afford larger or more complex boxes, whereas said equalizers involve frames having four corner-posts, a lateral top plate, and a lateral bottom plate, the rows of resistance-coils being vertically suspended and supported by and insulated from the said two plates. In such of said prior equalizers as embodied rows of resistance-coils and insulating-bars two of the latter were required for each row, and said bars were connected to or supported by and insulated from the top and bottom plates of the frame, whereas in my box the two insulated sides of a substantially flat frame support two parallel rows of resistance-coils, thus securing in each box a comparatively large capacity, desirable compactness, and simplicity in construction, together with the capacity for a ready union of two or more boxes into a solid structure, which can be put into service whether lying on either side or standing on either end, and whether the coils be horizontal or vertical. In operating elevators by electricity supplied from commercial circuits much resistance is required, involving in some cases resistance-boxes of large bulk, and their presence is generally deemed by fire-insurance underwriters as a constant high-risk factor, and this is augmented by the fact that these boxes are sometimes located quite near the foot of an elevator-shaft, which is well recognized as a special danger-point in the event of fire.

My improved resistance-boxes have been specially devised by me with reference to securing safety against fire in electric-elevator service, wherein economy in space is of special importance; but their value in many more or less similarly important connections will be readily recognized. Moreover, boxes embodying my invention are very durable, and can be produced economically and handled and used with little liability of getting out of order.

After describing in detail the resistance-boxes illustrated in the drawings the features deemed novel will be specified in appropriate clauses of claim hereunto annexed.

Figure 1 illustrates one of my resistance-boxes in top or plan view. Fig. 2 illustrates several of said boxes in edge view, as when piled upon each other and mechanically connected. Fig. 3 illustrates the main frame of the box, Fig. 1, the same being shown in top, side, and end views, and also in section. Fig. 4, in several views, illustrates insulating-bars used with said frame. Fig. 5, in top view, illustrates a somewhat more complex and more expensive form of box embodying my invention. Fig. 6 is a central longitudinal section of a part of the frame of the box, Fig. 5. Fig. 7 illustrates one of the sections of one of the insulating-bars from Fig. 5 in several views. Fig. 8, in several views, illustrates another mode of constructing the frame. Fig. 9 illustrates the application of insulating screw-posts, as is sometimes desirable with my boxes. Figs. 10 and 11 illustrate another form of my box, in which consecutive coils occupy the same plane, instead of different planes, as in the other forms. Fig. 12 illustrates still another form of insulating-bar.

The box of Figs. 1 to 4, inclusive, has a solid substantially flat cast-iron frame A, rectangular in form, and provided at each corner with a tubular ear *a* for the reception of a bolt, by means of which several boxes may be united into a firm solid structure, which will enable it to be readily handled, the spaces between the end portions $b$ of any two boxes affording ample finger-space and rendering special handles unnecessary. The sides $c$ of this frame are much thinner than the ends $b$, and are located centrally with reference to the corner ears $a$, so as to afford ample space for the reception of the insulating-bars $d$, composed of glass, porcelain, or other strong incombustible refractory material having a suitable insulating capacity. The insulating-bars may be variably formed; but these are substantially rectangular and longitudinally grooved, as at $d'$, at their inner sides for embracing the side pieces $c$. They are also grooved or scored laterally at their edges, as at $d^2$. The resistance-coils $e$ in this box consecutively occupy different horizontal planes, the intermediate wire $e'$ occupying scores $d^2$ in straight lines at one side, and at the other side said wire securely lies in diagonally-opposite grooves. In this form of bar small holes at the ends are provided for the reception of wire terminals, as clearly shown in Fig. 2. The wire of which these coils is composed is not provided with an insulating-jacket, inasmuch as all combustible matter should be avoided; but this does not preclude the use of such a mineral coating or varnish as asbestus paint or well hardened silicate of soda applied to a completed box, although I have found that naked wire can be fully relied upon. In this box, Fig. 1, the insulating-bars $d$ are constructed in counterpart sections, each bar being in three parts, and each of these have edge grooves for accommodating connecting-wires $e'$ of ten coils $e$, the thirty coils being in two rows, and these rows are well separated from each other, and so also are the coils in each row. In this instance the coils are not composed of integral wire throughout the set, the ends $e'$ being jointed and soldered at several points, as at $e^2$. The dimensions of the insulating-bars are considerably less than the appropriate dimensions of the ears $a$, so that when the boxes are piled ample space is afforded between the insulating-bars to prevent the wires $e'$ on one bar from being too near the wires on a coincident bar, as is clearly indicated in the drawings. Several of these boxes piled one upon another, as in Fig. 2, are firmly secured together by means of the corner bolts $f$, thus forming a complete and substantial structure, which can be readily handled and moved from place to place without liability of injury to the boxes. In this instance the wire ends $e'$ are left free at each box for separate connections; but in some cases the coils of two or more boxes will be connected in one circuit either by soldered joints or by means of insulated posts, as illustrated in Fig. 9.

The post-socket $g$ has a perforated ear $g'$, enabling it to be clamped between the corners of any two boxes, a washer of corresponding thickness being applied at each of the other corners. This socket contains tapered glass plugs $g^2$, having holes for receiving the shank of a screw-post $h$. This shank has a shoulder at one end and a screw-thread at the other end for the reception of a nut $g^3$. With sheet-lead washers between the glass plugs and the nut and shoulder the screw-post may be firmly set without liability of fracturing the plugs.

A box of a somewhat more complex structure, but embodying my invention, is illustrated in Figs. 5 to 7, inclusive. In this instance the iron frame $A'$ is not an integral casting. The ears $i$ are counterparts and separately constructed (and they may be composed of cast-iron) and provided with the tubular corner ears $a$. The sides of the frame are rods or bolts $k$, which occupy suitable holes in the end pieces. The insulating-bars of this box are composed of specially-strong glass or pottery, but in numerous counterpart sections $l$, which are provided with a hole $l'$ and with edge grooves $d^2$ and a well-rounded smooth outer side, as at $d^3$. All of the corners of each section are well rounded, not only facilitating molding operations during their production, but obviating much liability of fracture. The holes $l'$ are enough larger than the side rods $k$ to freely accommodate a piece of iron pipe $m$ a little longer than the aggregate length of the sections in the box, so that when the bolts are inserted and their nuts well set the pipe will serve as an abutment and enable the frame to be stiffly clamped without unduly clamping and endangering the insulating-bars. With this form of box all of the coils may be integrally connected and solder-jointing readily avoided. The coiling of the wire may be obviously conducted indefinitely, and the length of the connecting-wire $e'$ can be made absolutely uniform throughout the set. Having cut off any desired number of coils in one length, they may then be wrapped symmetrically upon a piece of hard-wood plank having well-rounded edges and a little narrower than the outside lateral or flatwise dimensions of the frame, (with the insulating-bars added thereto,) care being taken to secure symmetrical and well-formed bends between each two coils. When the coils have been thus arranged, the two rods are inserted in their appropriate end piece. The pipes are then placed thereon, and then the sections $l$ may be progressively applied, the coils being meantime progressively slipped from the plank or "former" to the sections until all are in place, and then the other end piece may be applied to the rods and firmly clamped by the nuts.

In one form of my box the sides of the frame may be constructed as shown in Fig. 8. In this instance the side $n$ is composed of cast-iron and has a central cored hole for the reception of a clamping-rod. It is also provided with three longitudinal grooves with inclined sides for the reception of insulating-bars $n'$ $n^2$, which in cross-section have the form of a keystone, so as to snugly occupy the grooves. The edge bars $n'$ are provided with grooves $d^2$; but the bar $n^2$ is simply rounded at its outer side. With this form of frame these insulating-bars may be either constructed separately and set with plaster-of-paris or formed in the grooves and baked therein, and with either mode they can be securely keyed in place, with little liability of displacement, even if they should be subsequently cracked. It is not to be understood that my invention is restricted to such a construction as will cause consecutive coils to occupy alternate planes parallel with the metallic frame. As illustrated in Figs. 10 and 11, the metal side pieces $c$ of the frame are provided with projecting spurs or studs $c'$, which may be either integral with the casting or pins composed of heavy wire. On each of these studs a section of an insulating-bar in cylindrical or oval form is mounted and firmly secured, as by the use of plaster-of-paris. Each of these sections $l^3$ is annularly grooved for the reception of the wire $e'$. With this form of box the coils in the two layers may be readily connected at their terminals either by soldering or by means of screw-posts.

While I deem it preferable to use refractory material, because of economy and its absolute reliability, it is to be understood that asbestos in suitable forms may be employed with good results, and especially in connection with the sides of a frame grooved as in Fig. 8. It is obvious that with such a frame asbestos felting, for instance, can be folded, massed, and packed into the grooves, as illustrated at $l^4$ in Fig. 12, and well secured therein, as by plaster-of-paris or other mineral cement. The central portion of each pad, if composed of the edges of the pieces of non-combustible felting, will enable grooved depressions to be readily developed by mere compression for securely retaining the wire $e'$ in position.

It will be seen that with the use of my boxes all danger from fire is eliminated and that the coils in each row, as well as those in the two rows, can be securely and permanently maintained in a properly-separated condition, because there is no such liability of displacement as is incident to such warping and twisting as is liable to occur with wooden frames. It will also be seen that the several parts of a box may be economically produced and readily assembled and that any number of them may be readily grouped and combined into a substantially solid structure, and also that the sectional insulating-bars and their rods readily enable variations in the number of coils for each box, this involving only few or many of the sections and rods of varied length, the end pieces being always the same. A connected set of my boxes can be applied to service regardless of whether they are standing edgewise, endwise, or flatwise, and this is a matter of substantial value, because it enables their location in convenient spaces and in places which will readily accommodate them in but one of these several positions. When the wire is coiled with special care and each coil provided with a hooked holder, which will prevent all possibility of irregular distention of the coils, a connected set of the closely-wound coils may be wound upon a former-plank, so that it will then be practicable to slip the set of coils off upon a set of insulating bars or tubes and to apply the end pieces of the frame and the side bolts to so distend all of the coils that a perfect air-insulation will be secured between each two convolutions in each coil.

It will be seen that without departure from my invention the insulating-bars may be widely varied in form, but that in all of the forms shown they serve as supports for the connecting-wire of two or more coils, and the non-combustible material may be considered in connection with each metallic side piece as constituting an insulated supporting-bar in a rigid metallic frame.

Having thus described my invention, I desire to secure by Letters Patent—

1. The combination, substantially as hereinbefore described, of a set of resistance-coils in two parallel rows, a rigid substantially flat metallic frame, and insulating-bars on said frame composed of refractory non-combustible material and maintaining the rows of coils and the coils in each row in a properly-separated condition and thoroughly insulated from the metallic frame.

2. The combination, substantially as hereinbefore described, of a set of resistance-coils, non-combustible insulating-bars, and a rigid substantially flat metallic frame provided with tubular ears, whereby several of such boxes piled one above another may be clamped and converted into a solid structure by means of bolts occupying said ears.

3. The combination, substantially as hereinbefore described, of a set of consecutively-connected resistance-coils, a rigid substantially flat metallic frame, and insulating-bars composed of refractory material and constructed in sections, each serving with a portion of the frame as a support for the portions of wire intervening between the ends of consecutive coils.

RUDOLF EICKEMEYER, JR.

Witnesses:
R. EICKEMEYER,
HENRY OSTERHELD.